United States Patent [19]

McCay, Jr. et al.

[11] 3,756,095
[45] Sept. 4, 1973

[54] RING GEAR ARRANGEMENT IN A PLANETARY DRIVE

[75] Inventors: Frank V. McCay, Jr.; Rolf A. Knopp, both of Salt Lake City, Utah

[73] Assignee: Envirotech Corporation, Salt Lake City, Utah

[22] Filed: Aug. 30, 1971

[21] Appl. No.: 175,829

[52] U.S. Cl. .................................. 74/801, 180/43 B
[51] Int. Cl. ..... F16h 1/36, F16h 57/08, B60k 17/04
[58] Field of Search ...................... 74/801; 180/43 B

[56] References Cited
UNITED STATES PATENTS

| | | | |
|---|---|---|---|
| 2,941,423 | 6/1960 | Armington et al. .................... | 74/801 |
| 3,221,832 | 12/1965 | Holmstrom .................... | 180/43 B X |
| 1,151,381 | 8/1915 | Olson.................................... | 74/801 |
| 2,407,975 | 9/1946 | Christian............................... | 74/801 |
| 3,352,177 | 11/1967 | Cleff et al............................. | 74/801 |
| 3,518,897 | 7/1970 | Bixby................................. | 74/801 X |
| 3,570,815 | 3/1971 | Nelson............................... | 74/801 X |
| 3,583,825 | 6/1971 | Sadler et al........................ | 74/801 X |

*Primary Examiner*—Charles J. Myhre
*Assistant Examiner*—Thomas C. Perry
*Attorney*—Robert R. Finch et al.

[57] ABSTRACT

A sun-gear is fixedly mounted on the end of a rotatable shaft to drive a planetary gear train of the type in which an internal ring-gear is fixed against radial and angular movement by a stationary hub encircling the shaft. A planet carrier is fixed for rotation as a unit with a second hub which extends back over the gear train and which rotates upon and around the stationary hub. The ring-gear is axially located between bosses formed as interrupted planar bearing pads extending from the rotating hub and the planet carrier respectively.

5 Claims, 6 Drawing Figures

INVENTORS.
ROLF A. KNOPP
FRANK V. MCCAY JR.
BY
Robert E. Krebs
ATTORNEY

Patented Sept. 4, 1973

INVENTORS.
ROLF A. KNOPP
FRANK V. MCCAY JR.

BY Robert E. Krebs
ATTORNEY

Patented Sept. 4, 1973
3,756,095
3 Sheets-Sheet 3
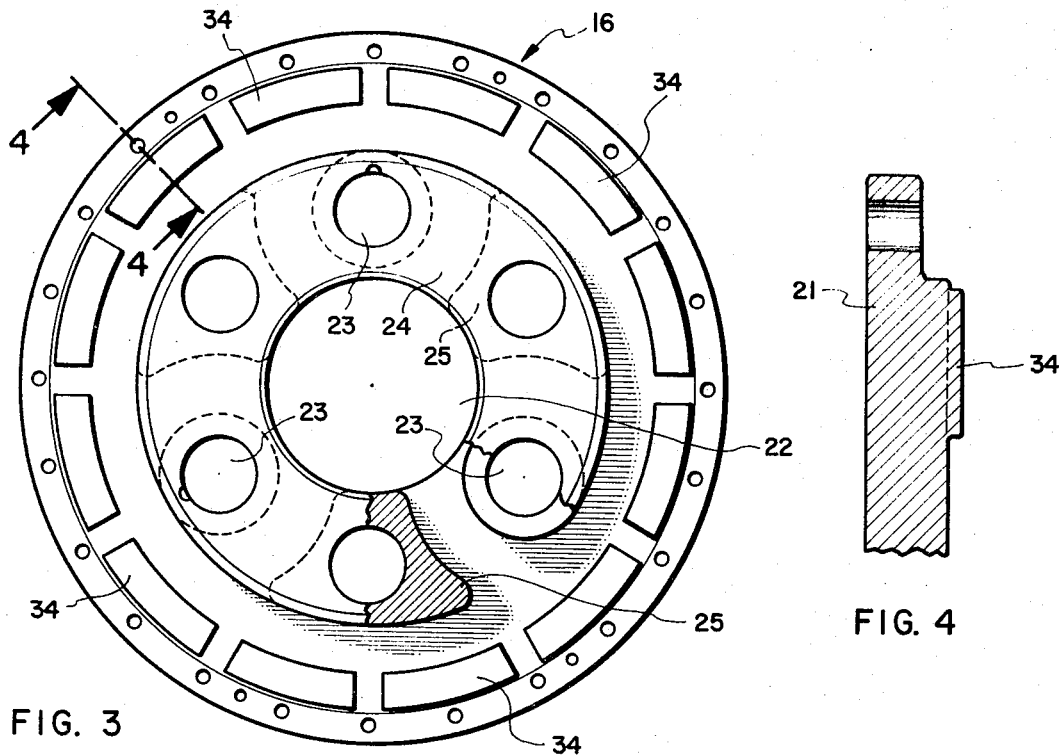
FIG. 3
FIG. 4
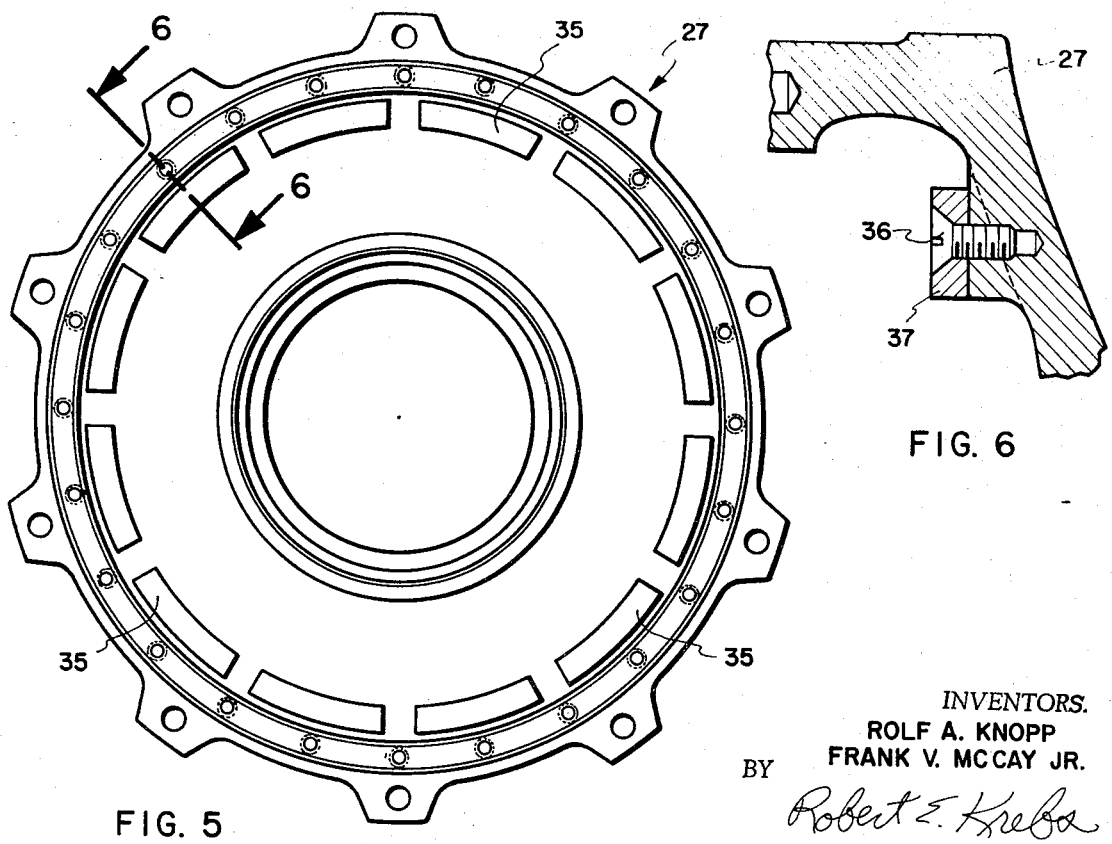
FIG. 5
FIG. 6
INVENTORS.
ROLF A. KNOPP
FRANK V. MCCAY JR.
BY Robert E. Krebs
ATTORNEY

3,756,095

RING GEAR ARRANGEMENT IN A PLANETARY DRIVE

DESCRIPTION OF PRIOR ART

Planetary gearing has long been utilized to provide a reduction drive between shaft and a driven wheel, as at the wheels of heavy-duty vehicles. In one known planetary gearing arrangement, a large ring-gear is fixedly supported concentrically from and around the end of a tubular axle-housing by a stationary hub to which the gear is bolted; an input shaft extends through the axle-housing and is splined at its end into a sun-gear for rotation therewith. A planet carrier operably holds rotatable planet-gears inter-engaged between the sun-gear and the surrounding ring-gear. The sun-gear, the planet-gears, and the ring-gear are all generally coplanar; and the input shaft, carrier and ring-gear are all coaxial. Rotation of the shaft drives the planet-gears in an orbit around the sun-gear within the periphery of the ring-gear; the rotating, orbiting planet-gears together rotatably drive the carrier, but at a reduced angular velocity with respect to the shaft. To structurally strengthen the carrier, a second hub is fixed to the carrier to form therewith an integral, rotating housing; this rotatable hub is extended back over the ring-gear and rotated on bearings about the first hub. A wheel may then be fixably connected to the carrier.

Such drive assemblies are frequently subjected to jerks and vibrations. To provide reliability, it is particularly important that the ring-gear be immovably fixed relative to the axle-housing; flex or misalignment of the ring-gear may cause binding and result in accelerated wear in the drive. On the other hand, a structurally complex ring-gear and its support may foil convenient maintenance. In the prior art, the ring-gear has been fixed to the stationary hub by a circle of bolts therearound and substantial clearance was provided between the ring-gear and the rotating housing.

OBJECTS OF THE INVENTION

An object of the invention is to provide a ring-gear assembly for use in planetary gear trains in which the ring-gear is readily removable without disturbing the remainder of the assembly.

Another object is to provide a ring-gear which may be easily assembled into such gear trains in a manner whereby the interconnection between the ring-gear and its associated hub is by splines rather than by relatively few bolts so that the load is evenly distributed.

A further object is to provide a structurally strong ring-gear which is economically machinable for use in such drives.

Yet, another object is to provide a ring-gear which is easily and conveniently located in proper position in such drives and which is restricted from axial displacement by thrust bearings.

A still further object is the provision of a construction enabling replacement of all or only part of the thrust bearings.

BRIEF DESCRIPTION OF THE DRAWINGS

FIG. 3 is a view of the carrier partially cut away, taken in the plane of line 3—3 of FIG. 2 and looking in the direction indicated by arrows 3;

FIG. 4 is a detail taken in the plane of lines 4—4 of FIG. 3, looking in the direction indicated by the arrows 4;

FIG. 5 is an elevational view of the hub of FIG. 2, looking in the direction indicated by arrows 5; and FIG. 6 is a detail taken in the plane of lines 6—6 of FIG. 5.

DETAILED DESCRIPTION OF THE INVENTION

Figure 1:
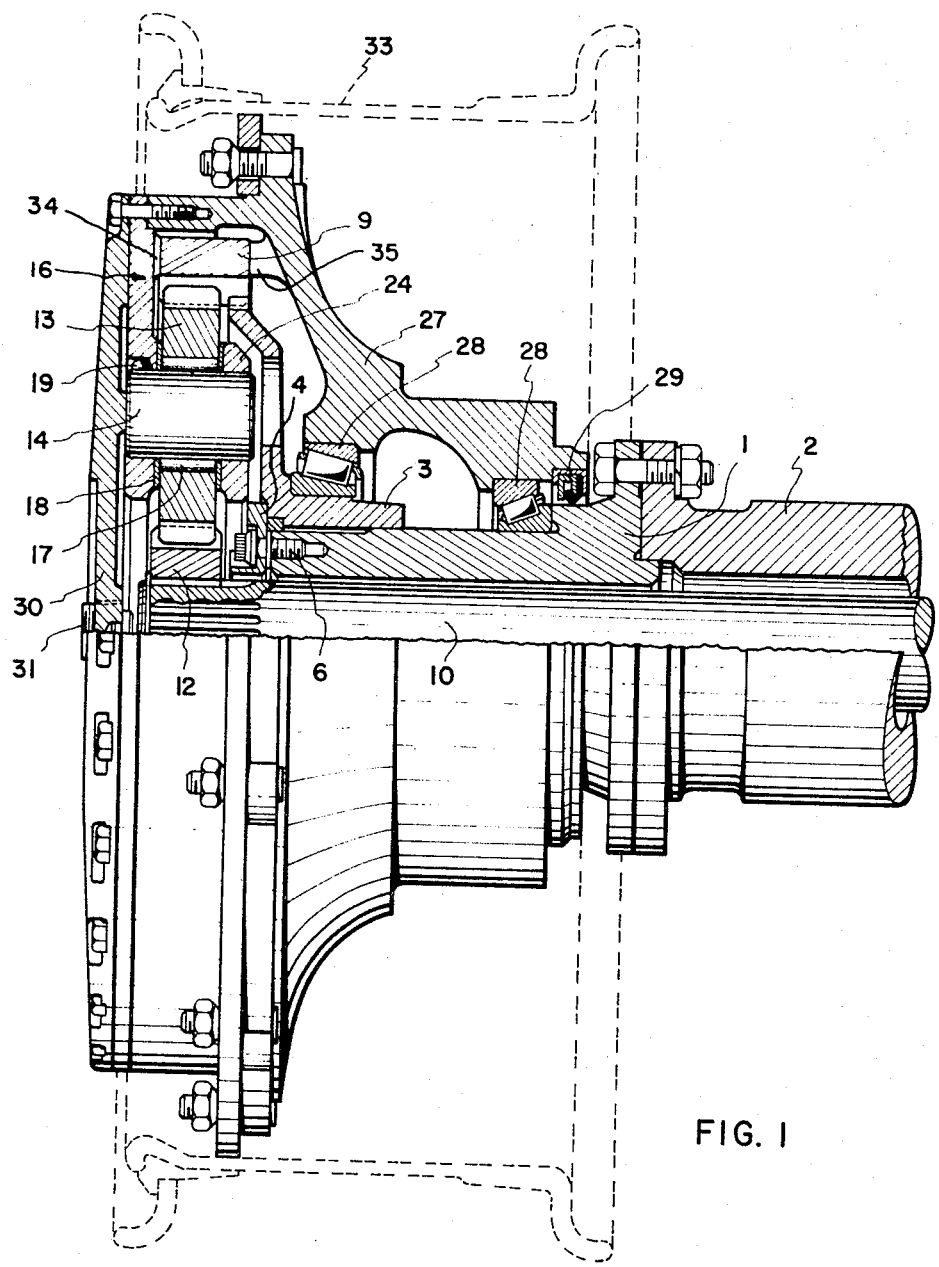
FIG. 1 is a side view, partially in section, of a drive embodying the invention.

One type of drive assembly to which the invention relates comprises a spindle 1 which has an axial passage therethrough and which is fixed at one end, as by bolts, to a tubular stationary housing 2. The opposite end of the spindle may be suitably splined, keyed, or otherwise adapted to fixedly receive a first hub 3. This stationary hub 3 may be adjustably retained on the spindle by a cap 4 and capscrews 6. The hub extends substantially radially outward from the spindle and at its radial periphery receives an internal ring-gear 9.

According to the invention, the stationary hub 3 has a plurality of splines formed therearound to mesh with the teeth of the internal ring-gear 9 so that the ring-gear is positioned radially and is restrained from moving angularly relative to the stationary hub.

An input shaft 10 extends through the axial passage in the spindle 21 and the extended end is fixed, as by splines and a snap-ring 11, into the center of a sun-gear 12. Three planet gears 13 mesh between the sun-gear 12 and the ring-gear 9 in a classical arrangement. These planet-gears rotate freely on shafts 14 mounted in planet carrier 16 by means of bearing sets 17, washers 18, and retaining balls 19.

Figure 2:
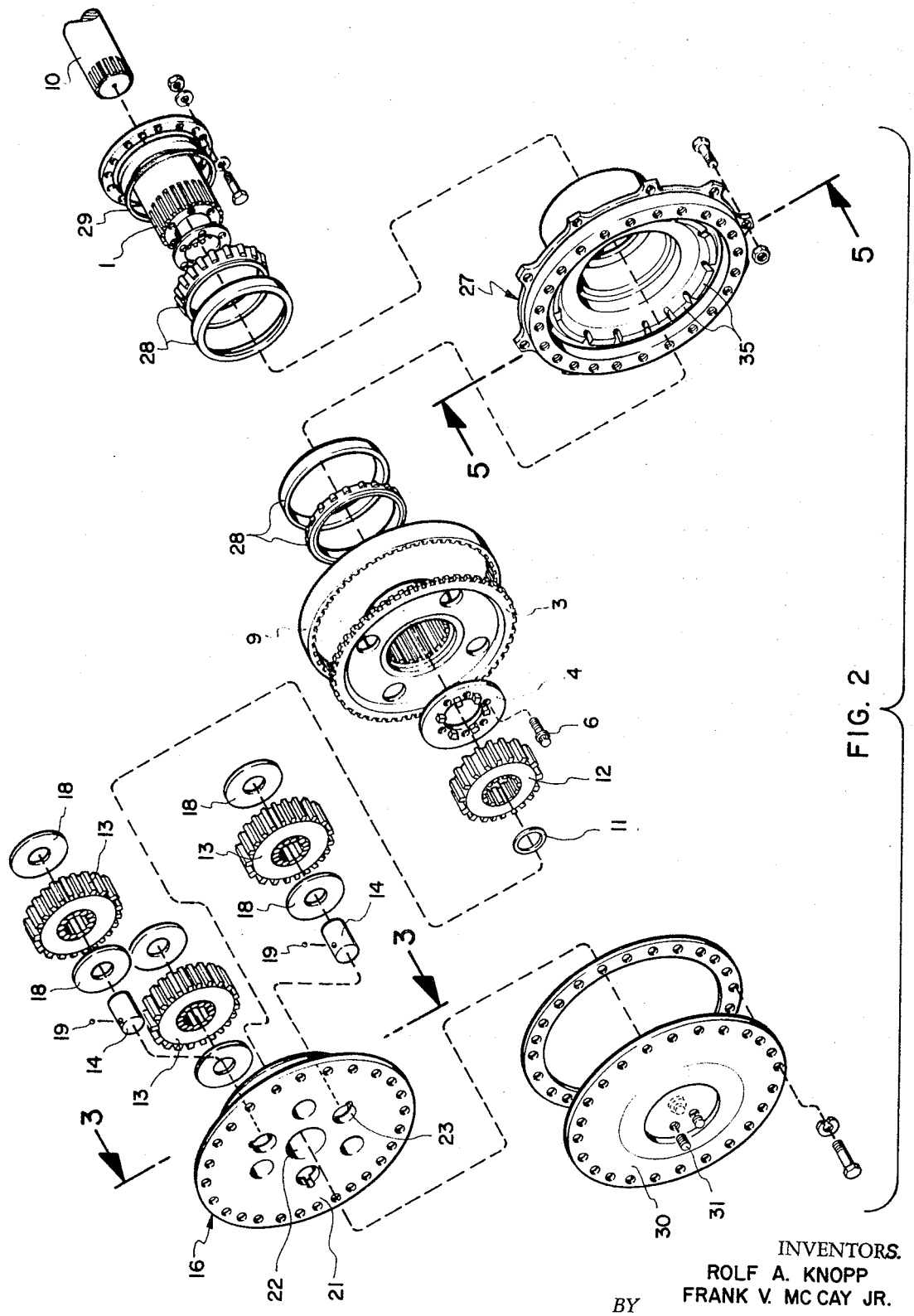
FIG. 2 is an exploded perspective view of the drive of FIG. 1.

The carrier, shown particularly in FIGS. 2–4, includes an enlarged circular plate 21 which has a central aperture 22 formed therethrough to provide clearance about the end of the shaft and which has equiangularly spaced apertures 23 located at equal distances from the aperture 22 to accommodate the planet-gear shafts 14; a similarly apertured backing plate 24 is integral with the enlarged plate 21 but is spaced therefrom by sector pieces 25 so that the planet-gears rotate in the spaces between the plates 21 and 24. Thus, the planet-gears are driven by the sun-gear 12 in a circular orbit inside of the stationary ring-gear 9; the orbiting planet-gears consequently drive the carrier in pure rotation with respect to the shaft 10. As is usual, the carrier rotates at reduced speed and with increased torque relative to the input shaft.

A hub 27 is secured by bolts around the carrier's radial edge to rotate as a unit therewith. This rotating hub extends back over the ring-gear and rotates upon and about the stationary spindle 4 and the stationary hub 3, being rotatably supported against axial displacement on both by inclined roller bearings 28. That is, the second hub and the carrier together form a rotatably driven housing over the gears. An annular seal 29 may be interposed to seal between the rotating hub and the spindle. A wheel 33, or the like, may be mounted to the rotating hub 20 to rotate therewith. A cover 30 may be fixed over the outer face of the carrier's plate 21 to complete enclosure of the drive assembly to retain lubricant therein, and the cover may have an associated lubricant filler plug 31.

According to the invention, a spaced series of planar bearing pads 34 and 35 have been provided concentric with the interior faces of the carrier plate 21 and rotary hub 27, respectively, to slide along the edges of the ring gear 9. These bearing pads or bosses function to locate the ring-gear at its proper axial orientation with respect to stationary hub 3. The ring-gear may be described as axially floating between the opposing circles of pads. The spaces or "interruptions" between the pads function similarly to oil grooves in thrust bearings to provide so-called "boundary lubrication." That is, lubricant enclosed with the gearing provides an oil bath, and the lubricating oil flows through the spaces between pads so that a load-bearing oil film can build between the stationary face of the ring-gear and the moving pads.

The combined structure effectively prevents axial, angular and transverse displacement of the ring-gear due to forces produced by misalignment or elastic deformation of the gear teeth, planet-gear axles, etc. Since the ring-gear is constrained axially by the opposing pads, the faces of the teeth of both the ring-gear and its support hub may be parallel to each and to the drive axis (that is, they may be spur gears). Then, the planet-gears may be correspondingly simple and axial thrust on the ring-gear is minimized during operation of the drive assembly. Furthermore, gears with teeth parallel to their axes are reversible. That is, the gear may be installed with either edge in. Also, the ring-gear can be removed from the described structure simply by removal of the cover 30 and without the need to loosen bolts, which might cause misalignment on the hub. Because the ring-gear need not be specially machined to accommodate restraining devices, it is stronger and less subject to breaking or cracking under load.

In a separate modification useful under other conditions, the ring-gear 14 and its hub 3 may have mutually interferring shoulders to prevent displacement of the ring-gear axially towards its hub; then, the bearing pads 35 would be omitted from hub 27 and pads 34 furnished only on the planet carrier. In construction, the pads 34 or 35 may be cast with the carrier and rotating hub, respectively, and the faces of the pads may be milled to provide the proper clearance and smoothness. In a special modification shown in FIG. 6, the pad bearing surfaces comprise replaceable pieces 37 adapted to be secured in place by suitable screws 36.

We claim:

1. A drive assembly comprising: (a) a planetary gear train which includes a sun-gear mounted on a rotatable shaft, and internal ring-gear disposed circumferentially about said sun-gear; and planet-gears which are intermeshed between said sun-gear and said ring-gear and which are rotatably driven in an orbit about and by said sun-gear within said ring-gear; (b) a hub which is stationarily mounted about said shaft and means connecting the hub to said ring gear to allow said ring-gear to move only axially; (c) a gear housing comprising a planet carrier for operably holding said planet-gears and a rotating hub fixed to said planet carrier for rotation about said stationary hub; and (d) bearing pads mounted on the inner face of both said planet carrier and said rotating hub engageable with opposite sides of said ring-gear to locate said ring-gear axially with respect to said planetary gear train, said bearing pads being spaced one from another on said inner faces.

2. A drive assembly according to claim 1 wherein said ring-gear is an internal spur gear and said planetary gears are also spur gears.

3. A drive assembly according to claim 1 wherein said means connecting the ring-gear and the first hub is a plurality of splines formed around the latters radial edge to mesh with the teeth of said internal ring-gear.

4. A drive assembly according to claim 1 wherein said pads are planar and are spaced one from another.

5. A drive assembly according to claim 1 wherein said pads are selectively detachable.

* * * * *